Patented July 6, 1937

2,085,809

UNITED STATES PATENT OFFICE 2,085,809

PROCESS FOR DYEING PELTS, HAIRS, AND FEATHERS

Erich Lehmann, Priorau, Kreis Bitterfeld, Germany, assignor to General Aniline Works, Inc., New York, N. Y., a corporation of Delaware No Drawing. Application October 2, 1936, Serial No. 103,671. In Germany October 12, 1935

7 Claims. (Cl. 8—5)

My present invention relates to a new process for dyeing pelts, hairs and feathers and more particularly to such a process wherein oxidation dyes are used for the purpose set forth.

The present invention is based on the observation that very good results are obtained by using for dyeing pelts, hairs and feathers a hydroxy compound, a poly-hydroxy compound, an amino compound, a poly-amino compound or an amino-hydroxy compound of a polynuclear hydrocarbon having more than two rings, for instance, anthracene, phenanthrene, chrysene, pyrene, decacyclene, dinaphthalene and acenaphthene which may also contain other substituents with the exception of free sulfonic or carboxylic acid groups, or a salt or molecular mixture thereof with an amine, hydroxy compound or amino-hydroxy compound of the aromatic or heterocyclic series, care being taken that if the solubility in water of the several salts or mixtures is not sufficient there is also present a dispersing agent. These derivatives of high molecular weight may be used, however, also alone or in the form of a mixture of any of them. The colorings obtained exceed those obtained with the known pelt dyes in respect of their fastness to light and to alkali.

The compounds in question correspond to the general formula

wherein R is a polynuclear hydrocarbon such as, for instance, anthracene, phenanthrene, chrysene, pyrene, decacyclene, acenaphthene, dinaphthalene, $w$ means —$NH_2$ or —OH and $x$, $y$, and $z$ stand for H, —OH, —$NH_2$ and —NH—. In the case of salt formation with a hydroxyaryl or aminoaryl respectively, $w$ means either —$NH_2$·OH·aryl or —OH·$NH_2$·aryl.

The following examples illustrate the invention, the parts being by weight:—

*Example 1.*—2 parts of a mixture consisting of 40 parts of a salt made from 3.5-dihydroxypyrene and paraphenylenediamine, and 60 parts of Turkey red oil are dissolved in 1000 parts of water and the solution is mixed with 20 parts of a solution of 3 per cent. strength of hydrogen peroxide. In the course of 3 hours a white lamb skin mordanted with chromium salt is dyed at room temperature a light gray-brown by using this bath.

*Example 2.*—2 parts of a mixture consisting of 40 parts of a molecular mixture of 3.5.8.10-tetra-hydroxypyrene and para-aminodiphenylamine, and 60 parts of a dispersing agent made by treating castor oil with 1-naphthyl-5-sulfonic acid in presence of sulfuric acid, as described in German specification No. 538,762, are dissolved in 1000 parts of water and there are added 20 parts of a solution of 3 per cent. strength of hydrogen peroxide. A white rabbit skin mordanted with chromium salt becomes a soft violet color when dyed at room temperature for 3 hours in this bath.

*Example 3.*—2 parts of a mixture consisting of 40 parts of a salt made from 1-hydroxyanthracene and paraphenylenediamine, and 60 parts of a dispersing agent made from solar oil (brown coal-tar oil) and xylene in the presence of fuming sulfuric acid, as described in German specification No. 552,328, Example 4, are dissolved in 1000 parts of water and there are added 20 parts of a solution of 3 per cent. strength of hydrogen peroxide. A white lamb skin mordanted with chromium salt is dyed at room temperature for 3 hours in this bath: a violet-gray is produced.

*Example 4.*—2 parts of a mixture consisting of 40 parts of a salt made from 1-hydroxychrysene and 1.5-diaminonaphthalene, and 60 parts of a dispersing agent made as described in German specification No. 552,328 are dissolved in water and there are added 20 parts of a solution of 3 per cent. strength of hydrogen peroxide. A white lamb skin mordanted with chromium salt and dyed for 3 hours at room temperature in this bath becomes a bright gray-red.

*Example 5.*—2 parts of a mixture consisting of 40 parts of a salt made from 5-amino-1-hydroxyanthracene and meta-phenylenediamine, and 60 parts of a dispersing agent made as described in German specification No. 552,328 are dissolved in 1000 parts of water and there are added 20 parts of a solution of 3 per cent. strength of hydrogen peroxide. A white rabbit skin mordanted with chromium salt and dyed for 3 hours at room temperature in this bath becomes a light brown.

*Example 6.*—2 parts of a mixture consisting of 40 parts of a salt made from 3.5-dihydroxypyrene and para-aminodiphenylamine, and 60 parts of Turkey red oil are dissolved in 1000 parts of water and there are added 20 parts of a solution of 3 per cent. strength of hydrogen peroxide. A white rabbit skin mordanted with chromium salt and dyed for 3 hours at room temperature in this bath is dyed green.

*Example 7.*—2 parts of a mixture of 40 parts of aminopyrene and 60 parts of Turkey red oil are dissolved in 1000 parts of water and 20 parts of a solution of 3 per cent. strength of hydrogen peroxide are added. A white lamb skin mordanted with an iron salt and dyed for 3 hours at room temperature in this bath becomes a green-gray. A gray is also produced on a chromium mordant.

*Example 8.*—1 part of 1.2.10-trihydroxyanthracene is dissolved in 1000 parts of water and the solution is mixed with 10 parts of a solution of 3 per cent. strength of hydrogen peroxide. A white rabbit skin mordanted with an iron salt and dyed for 3 hours at room temperature in this bath becomes a yellowish gray. On a chromium mordant a red-orange is produced.

In the table following hereafter, other compounds are enumerated which may be dyed in the same manner as indicated above on chromated pelts.

|    | Oxidation dye | Dyeing |
|----|---------------|--------|
| 1  | 2.2'-dihydroxy-7.7'-diamino-1.1'-dinaphthyl | Beige |
| 2  | 2.2'-dihydroxy-7.7'-di-(4-hydroxyphenylamino)-1.1'-dinaphthyl | Beige |
| 3  | Salt formed from 2.2'.7.7'-tetrahydroxy-1.1'-dinaphthyl and 1-amino-2-hydroxybenzene. | Beige |
| 4  | 4.4'-diamino-1.1'-dinaphtho-2.2'-N-methyl-carbazole and 1.5-dihydroxynaphthalene. | Brown. |
| 5  | Hydroxychrysene and 1.5-diaminonaphthalene. | Dark reddish brown. |
| 6  | Trihydroxydecacyclene and 4-aminodiphenylamine. | Black. |
| 7  | 2.2'.7.7'-tetrahydro-1.1'-dinaphthyl and 2-chloro-1.4-diaminobenzene. | Red-brown. |
| 8  | 2.2'.7.7'-tetrahydroxy-1.1'-dinaphthyl and 4-aminodiphenylamine. | Greenish-gray. |

For the sake of clarity I add hereafter the formulae of some of the polynuclear hydrocarbons in which the numbering of the C atoms is indicated, so that the nomenclature of the compounds named in the examples and in the table is clearly intelligible.

*Pyrene*

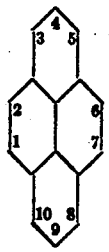

*Chrysene*

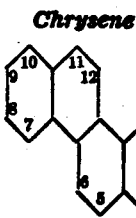

*1.1'-Dinaphthyl*

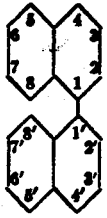

What I claim is:—

1. The process for dyeing pelts, hairs and feathers which comprises treating the said material in an aqueous dyeing bath containing hydrogen peroxide and a compound of the general formula

wherein R is the radicle of an aromatic hydrocarbon containing more than 2 nuclei, $w$ is a member of the group consisting of —OH, —NH₂, —OH·H₂N-aryl and —NH₂·HO-aryl and $x$, $y$ and $z$ are members of the group consisting of hydrogen, —OH, —NH₂ and NH-hydroxyphenyl.

2. The process for dyeing pelts, hairs and feathers which comprises treating the said material in an aqueous dyeing bath containing hydrogen peroxide and a compound of the general formula

wherein R is the radicle of a tetranuclear hydrocarbon, $w$ is a member of the group consisting of —OH, —NH₂, —OH·H₂N-aryl and —NH₂·HO-aryl and $x$, $y$ and $z$ are members of the group consisting of hydrogen, OH, —NH₂ and NH-hydroxyphenyl.

3. The process for dyeing pelts, hairs and feathers which comprises treating the said material in an aqueous dyeing bath containing hydrogen peroxide and a compound of the general formula

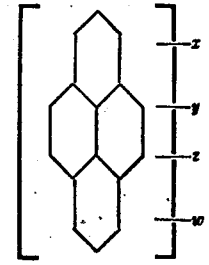

wherein $w$ is a member of the group consisting of —OH, —NH₂, —OH·H₂N-aryl and —NH₂·HO-aryl and $x$, $y$ and $z$ are members of the group consisting of hydrogen, —OH and —NH₂.

4. The process for dyeing pelts, hairs and feathers which comprises treating the said material in an aqueous dyeing bath containing hydrogen peroxide and a compound of the general formula

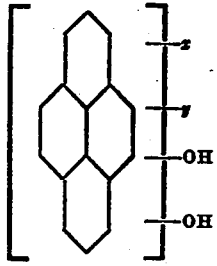

wherein $x$ and $y$ are members of the group consisting of hydrogen, —OH and —NH₂.

5. The process for dyeing pelts, hairs and feathers which comprises treating the said material in an aqueous dyeing bath containing hydrogen peroxide and a compound of the general formula

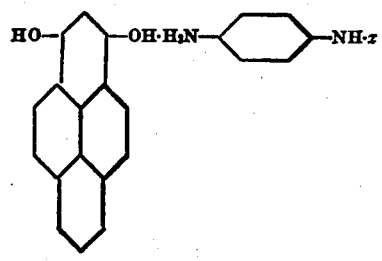

wherein $x$ is a member of the group consisting of H and phenyl.

6. The process for dyeing pelts, hairs and feathers which comprises treating the said material in an aqueous dyeing bath containing hydrogen peroxide and a salt made from 3.5-dihydroxypyrene and paraphenylenediamine.

7. The process for dyeing pelts, hairs and feathers which comprises treating the said material in an aqueous dyeing bath containing hydrogen peroxide and a salt made from 3.5-dihydroxypyrene and 4-aminodiphenylamine.

ERICH LEHMANN.